United States Patent [19]
Johnsen

[11] Patent Number: 5,211,247
[45] Date of Patent: May 18, 1993

[54] LANDSCAPING DEVICE

[75] Inventor: Bryan Johnsen, Brooklyn Park, Minn.

[73] Assignee: Insty Corporation, Brooklyn Park, Minn.

[21] Appl. No.: 719,162

[22] Filed: Jun. 21, 1991

[51] Int. Cl.⁵ .............................................. A01B 49/02
[52] U.S. Cl. ................... 172/197; 172/445.1; 172/233.684.5
[58] Field of Search ........... 172/72, 799.5, 197, 172/198, 199, 445.1, 684.5, 777, 784, 785–787, 690; 37/141 R, 142 R, DIG. 13, 276, 281, 266; 56/400.01, 400.04, 400.05, 400.06, 400.07, 400.16, 400.19

[56] References Cited

U.S. PATENT DOCUMENTS

| | | | |
|---|---|---|---|
| B 351,535 | 1/1975 | Hendrichon | 172/197 X |
| 85,154 | 12/1868 | Winters | 56/400.01 |
| 137,499 | 4/1873 | Steffensen | 172/197 |
| 142,755 | 9/1873 | Young et al. | 172/197 |
| 440,993 | 11/1890 | Crumb | 172/690 X |
| 631,767 | 8/1899 | Adams | 172/690 X |
| 644,614 | 3/1900 | Light | 172/197 X |
| 771,698 | 10/1904 | Bishop | 172/199 |
| 1,158,805 | 11/1915 | Haynes | 172/197 X |
| 1,224,438 | 5/1917 | Berge | 172/197 |
| 1,254,095 | 1/1918 | Ward | 172/197 |
| 1,267,654 | 5/1918 | Gilson | 56/400.16 |
| 1,842,892 | 1/1932 | Arthur | 172/690 X |
| 1,945,517 | 2/1934 | Carlson | 172/197 X |
| 1,986,327 | 1/1935 | Wind et al. | 172/198 X |
| 2,325,875 | 8/1943 | Oswald | 172/233 |
| 2,920,405 | 1/1960 | Cole | 172/197 |
| 3,448,814 | 6/1969 | Bentley et al. | 172/197 X |
| 3,613,802 | 10/1971 | Carlson et al. | 172/197 |
| 4,217,962 | 8/1980 | Schaefer | 172/197 |
| 4,356,645 | 11/1982 | Hine et al. | 37/281 |
| 4,359,103 | 11/1982 | Heitman | 172/197 |
| 4,924,945 | 5/1990 | Mork | 172/197 |
| 4,945,996 | 8/1990 | Codding | 172/233 |

FOREIGN PATENT DOCUMENTS

| | | | |
|---|---|---|---|
| 207154 | 1/1960 | Australia | 172/197 |
| 1094708 | 12/1967 | United Kingdom | 172/777 |

Primary Examiner—Dennis L. Taylor
Assistant Examiner—Jeffrey L. Thompson
Attorney, Agent, or Firm—Peterson, Wicks, Nemer & Kamrath

[57] ABSTRACT

A device (10) for working soil is disclosed in the preferred form including a grading portion (12) and a raking portion (32) of generally C-shapes. Specifically, the grading and raking portions (12, 32) are formed from planar, central sections (14, 34) and first and second, planar wing sections (16, 18, 36, 38) extending from the opposite ends thereof. The grading portion (12) includes a plurality of spaced, parallel blades (24) secured to the bottom surface of the body portion formed from a tubular beam (20) and a grading plate (22) and arranged at a nonparallel angle to the movement direction to serrate the soil. The blades (24) have elongated lengths greater than the thickness of the body portion and are spaced generally equal to their widths. The raking portion (32) includes a plurality of spaced, parallel, straight teeth (44) secured to a plate (40) and tilted at a forward angle to the movement direction. The lower ends of the teeth (44) are angled and are at the same level and coplanar with the bottoms of the blades (24) of the grading portion (12).

24 Claims, 1 Drawing Sheet

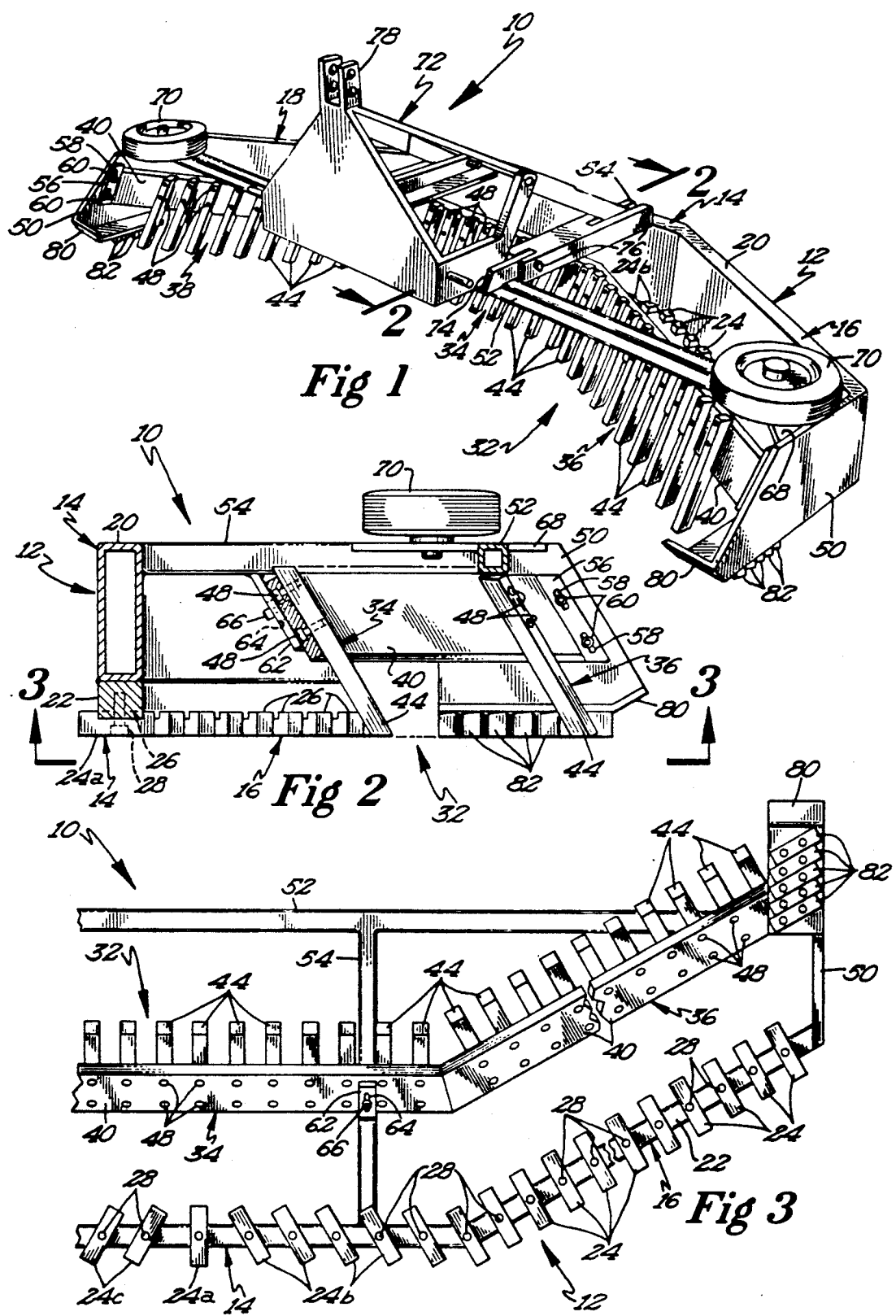

LANDSCAPING DEVICE

BACKGROUND

The present invention generally relates to devices for working soil, particularly to devices for fine grading soil surfaces, and specifically to devices for cleaning and finishing topsoil in preparation for seeding or sodding operations.

In preparation of topsoil for seeding or sodding and especially for areas of new construction, the topsoil must be leveled or smoothed out and debris such as rocks, large clumps of hardened soil, undesired plant material, and the like must be removed. Further, at least the surface of the topsoil must be loosened into a fine texture to allow root penetration. Prior to the present invention, various apparatus have been utilized to grade and level the soil and otherwise prepare the soil for seeding or sodding, but such prior apparatus suffered from various deficiencies. For example, often it was necessary to utilize several, separate implements, which is capital intensive to purchase the several, separate implements as well as inefficient due to the requirement to transport each of the several, separate implements to the work site and to changeover between implements. Likewise, often such apparatus utilized teeth or blades which rip the soil or utilized weights to pulverize the soil or push clods and other debris into the soil. Furthermore, such apparatus were deficient in containing the debris for ease of removal from the work area if desired. Further, such apparatus were unable to contour the soil into swales or berms if desired. Thus, a need exists for landscaping devices which overcome the many deficiencies of prior apparatus and allow the advantageous grading, and/or cleaning and finishing of soils in an efficient manner.

SUMMARY

The present invention solves this need and other problems in the working of soil by providing, in a first preferred aspect of the present invention, a plurality of spaced grading blades attached to the bottom surface of a grading portion, with the spacing between the grading blades being generally equal to the widths of the grading blades and with the width of the body portion being a multiple of the widths of the grading blades and equal to or less than the length of the grading blades.

In another aspect of the present invention, raking and grading portions are provided, with the raking portion including a plurality of spaced, straight raking teeth tilted in a direction opposite to the movement direction and with the grading portion including serrating members secured to the bottom surface thereof.

It is thus an object of the present invention to provide a novel device for working soil.

It is further an object of the present invention to provide such a novel device which serrates the top soil providing loose material of a fine texture.

It is further an object of the present invention to provide such a novel device which separates debris from the soil.

It is further an object of the present invention to provide such a novel device which collects debris for removal from the work area.

It is further an object of the present invention to provide such a novel device having the ability to transfer soil without spillover.

It is further an object of the present invention to provide such a novel device which fine grades the soil.

It is further an object of the present invention to provide such a novel device which can contour swales and berms in the soil.

It is further an object of the present invention to provide such a novel device which is able to finish topsoil in preparation for seeding or sodding operations.

It is further an object of the present invention to provide such a novel device which is operable in close vicinity to immovable objects.

It is further an object of the present invention of provide such a novel device utilizing rake teeth which do not rip the soil.

These and further objects and advantages of the present invention will become clearer in light of the following detailed description of an illustrative embodiment of this invention described in connection with the drawings.

Description of the Drawings

The illustrative embodiment may best be described by reference to the accompanying drawings where:

FIG. 1 shows a front perspective view of a landscaping device according to the preferred teachings of the present invention.

FIG. 2 shows a cross sectional view of the landscaping device of FIG. 1 according to section line 2-2 of FIG. 1.

FIG. 3 shows a partial bottom view of the landscaping device of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "lateral", "longitudinal", "bottom", "upper", "lower", "height", "width", "length", "front" "behind", "forward", "upward", and similar terms are used herein, it should be understood that these terms have reference only to the structure shown in the drawings as it would appear to a person viewing the drawings and are utilized only to facilitate describing the invention

DESCRIPTION

A device for working soil and particularly for cleaning and finishing topsoil in preparation for seeding or sodding operations or for fine grading surface areas such as ball diamonds, construction sites, or golf course fairways is shown in the drawings and generally designated 10. Device 10 generally includes an elongated, generally C-shaped grading portion 12 of an elongated length. Specifically, grading portion 12 includes a planar central section 14 having first and second, planar wing sections 16 and 18 extending from the opposite ends of section 14 at an angle in the order of 30°. Each of the sections 14, 16, and 18 includes a body portion formed from a tubular beam 20 of a vertically elongated, rectangular cross section and a grading plate 22 secured to the bottom of beam 20 such as by welding. Portion 12 further includes a multiplicity of rigid, straight, grading blades or teeth 24 secured to the bottom surface of the body portion in spaced relations generally parallel to each other. Specifically, teeth 24 extend generally perpendicular to plate 22 in wing sections 16 and 18, and with central section 14 including a central tooth 24a extending generally perpendicular to plate 22 of section 14, and with the teeth 24b and 24c on the opposite sides of tooth 24a extending at an angle in the order of 60° to plate 22 and generally parallel to teeth 24 of wing sections 16 and 18. Teeth 24 in the preferred form are formed from square, hardened, bar stock of an elongated length which is a multiple of their widths and particularly equal to four times their widths. Further, the length of teeth 24 is at least equal to and preferably generally twice the thickness of plate 22, with teeth 24 extending equidistant on the opposite sides of plate 22. In the preferred form, teeth 24 are equally spaced along plate 22 a distance generally equal to the width of teeth 24 and in the most preferred form generally equal to one and one half times the width of teeth 24 to effectively eliminate the entrapment of rocks. Additionally, the width of the bottom surface of plate 22 or in other words the thickness of the body portion is a multiple of the widths of teeth 24 and particularly equal to two times their widths. In the most preferred form, teeth 24 are removably secured to allow replacement by channels 26 of a size for slideable receipt of teeth 24 machined into plate 22 and by bolts 28 extending through teeth 24 and threadably received in plate 22. The depths of channels 26 are such that the height of the spacings between teeth 24 is generally equal to the height (and width due to their square cross section) of teeth 24 but still allow teeth 24 to be held by a single bolt 28 without pivoting about the bolt 28.

Device 10 further includes an elongated, generally C-shaped raking portion 32. Specifically, raking portion 32 includes a planar, central section 34 having first and second, planar wing sections 36 and 38 extending from the opposite ends of section 34 at an angle in the order of 30° and complementary to the C-shape of grading portion 12. Each of the sections 34, 36, and 38 includes a vertically, elongated rectangular plate 40 of a height generally equal to one-half of the height of beam 20. Portion 32 further includes a multiplicity of straight, rigid raking teeth 44 arranged in spaced, parallel relation in the planes of plates 40. Specifically, teeth 44 extend generally perpendicular to plate 40 in sections 34, 36, and 38. Teeth 44 in the preferred form are formed from the same square, hardened, bar stock as teeth 34 are formed and are of an elongated length generally two-and-one-half times the height of plate 40 and extend vertically below plate 40. Teeth 44 are equally spaced along plate 40 of sections 34, 36 and 3B a distance generally equal to twice the width of teeth 44. In the most preferred form, teeth 44 are removably secured to allow replacement by first and second bolts 48 extending through plate 40 and threadably received in teeth 44. The lower ends of teeth 44 are angled upwardly to the rear at an angle in the order of 30°, with the upper ends of teeth 44 being reversely angled in the preferred form when teeth 44 are cut from continuous bar stock.

In the preferred form, raking portion 32 is vertically adjustably positioned relative to, in front of, generally parallel to, and spaced from grading portion 12. Further, in the most preferred form, raking portion 32 is tilted at an angle in the order of 30° from the vertical away from grading portion 12 with the lower portion being ahead of the upper portion in the movement direction. Particularly, first and second side plates 50 extend from the opposite ends of wing sections 16 and 18 of grading portion 12 generally parallel to each other. A lateral frame beam 52 extends between and is secured to side plates 50 such as by welding in front of grading portion 12. First and second, longitudinal frame beams 54 extend generally perpendicularly between tubular beam 20 of central section 14 of grading portion 12 and beam 52. First and second mounting plates 56 extend from the opposite ends of wing sections 36 and 38 of raking portion 32 generally parallel to each other. Elongated mounting holes 58 are formed in plates 56 for receipt of bolts 60 threadably received in plates 50. Further, mounting plates 62 extend from beams 52 and 54 at a forward vertical angle in the order of 30° and include elongated mounting holes 64 for receipt of bolts 66 threadably received in plate 40 opposite teeth 44. In the most preferred form, raking portion 32 is vertically positioned relative to grading portion 12 such that the lower end of teeth 44 is generally at the same level as the bottom surface of teeth 24, with the 30° forward angle from the vertical of raking portion 32 and the 30° upward angle of the lower ends of teeth 44 allowing the lower ends of teeth 44 to be in the same plane as the bottom surface of teeth 24. Due to the adjustable mounting of raking portion 32, raking portion 32 can be adjusted as the lower ends of teeth 44 wear to generally correspond to the bottom surface of teeth 24.

Device 10 further includes gussets 68 extending between the upper portions of tubular beam 20 of sections 16 and 18 adjacent their outer ends and frame beam 52. Guide wheels 70 are rotatably mounted about vertical axes to gussets 68 and have portions extending slightly beyond the outer surfaces of plates 50.

Device 10 further includes provisions 72 for removable attachment to a tractor or like vehicle and can be of several types including for a standard 3-point hitch or the bucket attachment of a skid steer loader. Further, provisions 72 may be reversible to allow device 10 to be pushed when leveling and spreading piles of topsoil or scouring hard packed soil before finish grading or for pulling as when finishing top soil preparation and it is undesirable to have tire tracks present. Particularly, in the most preferred form, longitudinal frame beams 54 are channel or U-shaped in cross section. Provision 72 includes first and second arms 74 for slideable receipt in beams 54. Pins 76 extend through aligned apertures in beams 54 and arms 74 for holding arms 74 in beams 54. Provision 72 further includes a mount head 78 for removable attachment to the tractor such as a three point hitch as shown, the bucket attachment of a skid steer loader, or the like. Mount head 78 is secured to the ends of arms 74 and can include suitable bracing. In the most preferred form, the apertures in beams 54 and arms 74 are positioned allowing placement of mount head 78 either in front of raking portion 32 as shown in the drawings to allow device 10 to be pulled by the tractor or in back of grading portion 12 to allow device 10 to be pushed by the tractor. It should be appreciated that the reversibility of mount head 78 can be accomplished in other manners for example through the use of a turntable assembly or where provisions 72 include both front and mount heads 78. Likewise, it can be appreciated that provisions 72 can be attached to device 10 by other methods than aligned apertures and pins 76 and the particular construction of beams 54 and arms 74 for example by a quick attachment apparatus which can be attached from the tractor.

Now that the basic construction of device 10 according to the preferred teachings of the present invention has been set forth, the operation and advantages of device 10 can be explained and appreciated. After attachment to a suitable tractor, device 10 can be positioned with the lower ends of teeth 44 generally planar with the bottom surface of teeth 24 and device 10 is moved over the soil with the outside ends of grading portion 12 and raking portion 32 being ahead of the central sections 14 and 34, respectively, and the remaining portions of portions 12 and 32 in the movement direction. Raking portion 32 positioned in front of grading portion 12 separates debris such as rocks, stones, soil clods and the like from the soil prior to the grading action of portion 12. It can then be appreciated that due to the 60° angle of teeth 44 in a vertical plane from the forward movement direction of device 10, such debris will tend to ride up on teeth 44. As more debris is collected, the debris will push higher up on teeth 44 until it will fall forward under gravitational forces creating a tumbling action to the debris to shake soil from the debris and/or to break up hardened soil clods. Further due to the generally C-shape of raking portion 32, such debris will tend to move towards and collect in front of teeth 44 of central section 34 and specifically will not have a tendency to travel outwardly beyond the outside ends of raking portion 32 and device 10. Further, due to the 30° angle of sections 36 and 38 with respect to section 34, the 30° tilt angle of raking portion 32 to the vertical, and the spaced, parallel relation of teeth 44 in planes parallel to plates 40 and the tilt of raking portion 32, the top ends of teeth 44 of sections 36 and 38 angle towards central section 34 and enhance the inward movement of debris toward central section 34. Periodically, device 10 can be raised from the soil at convenient locations to remove debris collected by raking portion 32 from device 10 for removal from the work area.

Grading portion 12 of device 10 levels high and low areas of the work area according to the teachings of the present invention. Particularly, as the front surface and bottom surface of beam 20 and plate 22 prevent the passage of soil therethrough and due to the restricted size of passage between teeth 24, topsoil from high areas collect in front of plate 22 and beam 20 and flow to low areas for passage between teeth 24 as device 10 is moved over the work area. Further, due to the generally C-shape of grading portion 12, excess top soil will tend to move towards and collect in front of central portion 14 and specifically will not have a tendency to travel outwardly beyond the outside ends of grading portion 12 and device 10. Furthermore, such excess top soil will be held by device 10 for transfer to locations where soil is needed. Additionally, due to the nonparallel, 60° angle of teeth 24 in a horizontal plane from the movement direction of device 10 and the prior collection of debris by raking portion 32, teeth 24 serrate the top soil along the grading edge, both cutting and sifting the soil to leave a finished, fine-textured surface suitable for seeding or sodding.

It should further be noted that device 10 according to the teachings of the present invention can be tilted with the ends of portions 12 and 32 located above or below central sections 14 and 34. With device 10 tilted in that manner, device 10 is able to contour swales and berms as it moves over the work surface.

In the preferred form device 10 has a width at least equal to the width of the tractor and preferably about 50% wider for increased efficiency. With device 10 at least equal to the width of the tractor, device 10 is able to remove all tire tracks from the work area when device 10 is being pulled by the tractor. Further, device 10 can provide debris collection and soil preparation to the very edge of buildings, trees, or like immovable objects, with guide wheels 70 providing a rolling clearance between device 10 and such immovable objects.

It can be further appreciated that although device 10 is especially advantageous for performing finishing to the work area according to the teachings of the present invention, device 10 can be utilized to level piles of topsoil, and then to finish the leveled worked area and specifically without requiring change to other implements to perform these distinct functions as was done prior to the present invention.

It should be noted that with the lower ends of teeth 44 at the same level as the bottom surface of teeth 24 or flush with the grading surface, teeth 44 do not generally dig into or rip the soil of the working area but rather act in a raking function to separate the debris from the top soil. In the preferred form, device 10 according to the teachings of the present invention includes skid shoes 80 secured to side plates 50 for sliding on the soil for aiding in controlling the profile of device 10 as it is moved relative to the soil and for acting as a guide in generally preventing penetration of teeth 44 into the soil. To insure longevity, it is desirable for shoes 80 to be formed from hardened material and/or include replaceable wear surfaces. In a preferred form, such replaceable wear surfaces are created by securing teeth 82 (which can be of an identical construction as teeth 24 to reduce the number of different components required for device 10) at nonparallel angles to the movement direction and teeth 24 and in a tightly grouped, abutting manner for holding their positions of shoes 80. In the most preferred form, the outer ends of teeth 82 are located forward of the inner ends of teeth 82 when device 10 is moved in the forward movement direction.

It is further believed that the construction of grading portion 12 according to the preferred teachings of the present invention is particularly advantageous. Particularly, beam 20 and plate 22 provide considerable mass to the body portion to prevent the soil from bending the body portion and to allow the tractor to hold grading portion 12 at the desired level. Additionally, due to the large thickness of the body portion and the elongated length of teeth 24, excess soil tends to collect in front of the front surface of the body portion formed by beam 20 and plate 22 rather than be compressed and pass under grading portion 12. Thus, device 10 according to the teachings of the present invention is particularly advantageous when leveling piles of topsoil as well as fine grading of topsoils.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for working soil comprising, in combination: a grading portion for movement relative to the soil in a movement direction, with the grading portion including a body portion having a front surface and a bottom surface which prevent the passage of the soil therethrough, with the body portion being of an elongated length and a thickness; and a plurality of grading blades secured to the bottom surface of the body portion in spaced relations, with the grading blades having lengths at least equal tot he thickness of the body portion ,having heights, and having widths for serrating the soil, with the widths of the grading blades extending in a direction parallel to the bottom surface of the body portion, with the width of each grading bladed being constant throughout the height of the grading blade, with the spacing of the grading blades being generally equal to the widths for serrating the soil of the grading blades, with the thickness of the body portion being a multiple of the widths for serrating the soil of the grading blades.

2. The device of claim 1 wherein the grading blades are arranged in spaced, parallel relations.

3. The device of claim 2 wherein the heights of the grading blades are generally equal to the widths of the grading blades.

4. The device of claim 3 wherein the grading blades are arranged at a nonparallel angle to the movement direction.

5. Device for working soil comprising, in combination: a grading portion for movement relative to the soil in a movement direction, with the grading portion including a body portion having a front surface and a bottom surface which prevent the passage of the soil therethrough, with the body portion being of an elongated length and a thickness, with the body portion being generally C-shaped in plan view including first and second outside ends, with the outside ends of the body portion being ahead of the remaining portions of the body portion when the grading portion is moved in the movement direction; and a plurality of grading blades secured to the bottom surface of the body portion in spaced relations, with the grading blades having lengths at least equal to the thickness of the body portion and having widths for serrating the soil, with the widths of the grading blades extending in a direction parallel to the bottom surface of the body portion, with the spacing of the grading blades being generally equal to the widths for serrating the soil of the grading blades, with the thickness of the body portion being a multiple of the widths for serrating the soil of the grading blades and wherein the grading blades are arranged at a nonparallel angle to the movement direction.

6. The device of claim 5 wherein the body portion comprises, in combination: a planar, central section and first and second, planar, wing sections, with the wing sections extending from the opposite ends of the central section.

7. The device of claim 6 wherein the body portion comprises a tubular beam of a vertically, elongated rectangular cross-section and a grading plate secured to the bottom of the beam, with the bottom surface of the body portion being formed by the grading plate and with the front surface of the body portion being formed by the grading plate and the tubular beam.

8. The device of claim 6 further comprising, in combination: a raking portion for movement relative to the soil in the movement direction and in front of the grading portion.

9. The device of claim 8 wherein the raking portion includes an upper portion and a lower portion, with the raking portion being tilted with the lower portion being ahead of the upper portion in the movement direction.

10. The device of claim 9 wherein the raking portion is generally C-shape in plan view, complementary to the C-shaped body portion, with the raking portion being parallel to the grading portion.

11. The device of claim 10 wherein the raking portion includes a plurality of straight raking teeth arranged in spaced, parallel relation in planes parallel to the tilt of the raking portion.

12. The device of claim 11 wherein the raking portion comprises, in combination: a planar, central section and first and second, planar, wing sections, with the wing sections extending from the opposite ends of the central section.

13. The device of claim 11 wherein the lower ends of the raking teeth are at the same level as the bottoms of the grading blades.

14. The device of claim 13 further comprising, in combination: means for vertically adjusting the raking portion relative to the grading portion.

15. The device of claim 13 wherein the lower ends of the raking teeth are angled and are generally planar with the bottoms of the grading blades.

16. Device for working soil when moved in a movement direction comprising, in combination: a raking portion including a plurality of straight raking teeth arranged in spaced, parallel relations, with the raking teeth having lower ends and upper ends, with the raking teeth being tilted with the lower ends being ahead of the upper ends when the device is moved in the movement direction; and a grading portion positioned behind the raking portion when the device is moved in the movement direction, with the grading portion including a front surface and a bottom surface which prevent the passage of soil therethrough; and means secured to the bottom surface of the grading portion for serrating the soil; wherein the raking portion and the grading portion are generally C-shaped in plan view including first and second outside ends, with the outside ends of the raking portion and the grading portion being ahead of the remaining portions of the raking portion and the grading portion when the device is moved in the movement direction.

17. The device of claim 16 wherein each of the raking portion and the grading portion comprises, in combination: a planar, central section and first and second, planar, wing sections, with the wing sections extending form the opposite ends of the central section.

18. The device of claim 17 wherein the lower ends of the raking teeth are in the same plane as the bottom of the serrating means.

19. The device of claim 18 wherein the serrating means comprises grading blades arranged in spaced, parallel relations at a nonparallel angle to the movement direction.

20. Device for working soil comprising, in combination: a frame; a grading portion secured to the frame for movement relative to the soil in a movement direction, with the grading portion including a body portion having a front surface and a bottom surface which prevent the passage of the soil therethrough, with the body portion being of an elongated length and a thickness, with the body portion being generally C-shaped in plan view including first and second outside ends, with the outside ends of the body portion being ahead of the remaining portions of the body portion when the grading portion is moved in the movement direction; and a raking portion for movement relative to the soil in the movement direction and separately secured to the frame spaced from and in front of the grading portion, with the raking portion separating debris from the soil prior to the grading portion.

21. The device of claim 20 further comprising, in combination: a plurality of grading blades secured to the bottom surface of the body portion in spaced relations.

22. Device for working soil comprising, in combination: a grading portion for movement relative to the soil in a movement direction, with the grading portion including a body portion having a front surface and a bottom surface which prevent the passage of the soil therethrough, with the body portion being of an elongated length having a planar, central section and first and second, planar, wing sections, with the wing sections extending from the opposite ends of the central section, with the wing sections angled forwardly from the central section when the grading portion is moved in the movement direction; and a plurality of grading blades secured to the bottom surface of the body portion in spaced relations, with the grading blades having elongated lengths at least equal to the thickness of the body portion, with the grading blades extending at an acute angle to the movement direction of the grading portion, with the grading blades on the first side being parallel and angled outwardly from front to rear with respect to the movement direction of the grading portion and the grading blades on the second side being parallel and angled outwardly from front to rear with respect to the movement direction of the grading portion and reverse of the outward angle of the grading blades on the first side.

23. The device of claim 22 wherein the grading blades extend generally perpendicular to the wing sections.

24. Device for working soil comprising, in combination: a raking portion for movement relative to the soil in a movement direction, with the raking portion including a planar, central section extending generally perpendicular to the movement direction and first and second, planar, wing sections extending from the opposite ends of the central section, with the wing sections angled forwardly form the central section when the raking portion is moved in the movement direction; and a plurality of raking teeth arranged in spaced, parallel relations secured to the central section; a plurality of raking teeth arranged in spaced, parallel relations secured to each of the wing sections, with the raking teeth having lower, free ends and upper ends, with the raking teeth being tilted with the lower ends being ahead of the upper ends when the raking portion is moved in the movement direction, with the raking teeth of the wing sections being tilted with the upper ends being angled towards the central section.

* * * * *

UNITED STATES PATENT AND TRADEMARK OFFICE
CERTIFICATE OF CORRECTION

PATENT NO. : 5,211,247  Page 1 of 2
DATED : May 18, 1993
INVENTOR(S) : Bryan Johnsen It is certified that error appears in the above-identified patent and that said Letters Patent is hereby corrected as shown below:

Column 2, line 53, after "invention" add --.--.

Column 3, line 56, cancel "3B" and substitute therefor --38--.

Column 4, line 67, after "and" insert --rear--.

Column 5, line 26, after "Further" insert --,--.

Column 7, line 11, cancel "tot he" and substitute therefor --to the--.

Column 7, line 12, cancel "tion ,having" and substitute therefor --tion, having--.

Column 7, line 15, cancel "bladed" and substitute therefor --blade--.

Column 8, line 8, cancel "C-shape" and substitute therefor --C-shaped--.

Column 8, line 53, cancel "form" and substitute therefor --from--.

UNITED STATES PATENT AND TRADEMARK OFFICE
CERTIFICATE OF CORRECTION

PATENT NO. : 5,211,247
DATED : May 18, 1993
INVENTOR(S) : Bryan Johnsen

It is certified that error appears in the above-indentified patent and that said Letters Patent is hereby corrected as shown below:

Column 10, line 18, cancel "form" and substitute therefor --from--

Signed and Sealed this

Eighteenth Day of January, 1994

Attest:

BRUCE LEHMAN

Attesting Officer     Commissioner of Patents and Trademarks